(12) United States Patent
Edwards et al.

(10) Patent No.: US 10,397,857 B2
(45) Date of Patent: *Aug. 27, 2019

(54) SERVICE MODE DISPLAY ON A HANDHELD COMMUNICATION DEVICE

(71) Applicant: BlackBerry Limited, Waterloo (CA)

(72) Inventors: Robert John Edwards, Waterloo (CA); Andrew Douglas Bocking, Los Altos, CA (US)

(73) Assignee: BlackBerry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/470,451

(22) Filed: Mar. 27, 2017

(65) Prior Publication Data

US 2017/0208541 A1    Jul. 20, 2017

Related U.S. Application Data

(63) Continuation of application No. 14/687,616, filed on Apr. 15, 2015, now Pat. No. 9,642,185, which is a
(Continued)

(51) Int. Cl.
| | |
|---|---|
| *H04M 1/00* | (2006.01) |
| *H04B 1/38* | (2015.01) |
| *H04W 48/18* | (2009.01) |
| *H04W 48/08* | (2009.01) |
| *H04W 88/06* | (2009.01) |

(Continued)

(52) U.S. Cl.
CPC ........ *H04W 48/18* (2013.01); *G06F 3/04817* (2013.01); *H04M 1/72583* (2013.01); *H04W 8/22* (2013.01); *H04W 12/06* (2013.01); *H04W 48/08* (2013.01); *H04W 60/00* (2013.01);
(Continued)

(58) Field of Classification Search
CPC .......... H04W 4/00–006; H04W 8/005; H04W 8/18–22; H04W 28/0215; H04W 40/246; H04W 40/248; H04W 76/00; H04W 76/02; H04W 76/04; H04W 88/00; H04W 88/02–06; H04W 92/00; H04W 92/08; H04W 92/10; H04W 92/16; H04W 92/18
See application file for complete search history.

(56) References Cited

U.S. PATENT DOCUMENTS 5,903,832 A   5/1999  Seppanen et al.
6,438,390 B1  8/2002  Awan
(Continued)

FOREIGN PATENT DOCUMENTS

GB    2341514 A    3/2003

*Primary Examiner* — San Htun
(74) *Attorney, Agent, or Firm* — Moffat & Co

(57) ABSTRACT

In a handheld communication device capable of a plurality of wireless communication modes, a method of communication begins by receiving, at the handheld communication device, a notification of an available one of the wireless communication modes. Then, in a data communication window of the communication device, a user-indication of an active one of the available wireless communication modes is provided in accordance with the received communication mode indication. The data communication window is configured to facilitate data communication via the plurality of wireless communication modes, and facilitates the data communication via the active wireless communication mode.

15 Claims, 10 Drawing Sheets

Related U.S. Application Data continuation of application No. 11/694,141, filed on Mar. 30, 2007, now Pat. No. 9,026,177.

(51) Int. Cl.
  *H04M 1/725* (2006.01)
  *G06F 3/0481* (2013.01)
  *H04W 8/22* (2009.01)
  *H04W 12/06* (2009.01)
  *H04W 60/00* (2009.01)
  *H04M 3/00* (2006.01)
  *H04W 84/12* (2009.01)
  *G06F 3/0482* (2013.01)

(52) U.S. Cl.
  CPC ........... *H04W 88/06* (2013.01); *G06F 3/0482* (2013.01); *H04W 84/12* (2013.01)

(56) References Cited

U.S. PATENT DOCUMENTS

| | | | |
|---|---|---|---|
| 6,546,263 B1 | 4/2003 | Petty et al. | |
| 7,072,468 B2 | 7/2006 | Murray et al. | |
| 7,133,669 B2 | 11/2006 | Nair et al. | |
| 7,245,913 B1* | 7/2007 | Nguyen | H04W 88/06 455/428 |
| 7,756,485 B2 | 7/2010 | Paas et al. | |
| 2003/0119454 A1* | 6/2003 | Hattori | H04W 48/16 455/73 |
| 2004/0076177 A1 | 4/2004 | Koch et al. | |
| 2004/0215845 A1 | 10/2004 | Davani et al. | |
| 2004/0266426 A1 | 12/2004 | Marsh et al. | |
| 2005/0079863 A1 | 4/2005 | Macaluso | |
| 2005/0111463 A1* | 5/2005 | Nepomuceno Leung | H04W 92/18 370/395.52 |
| 2005/0152304 A1 | 7/2005 | Park | |
| 2005/0238046 A1* | 10/2005 | Hassan | H04L 12/5692 370/465 |
| 2006/0183477 A1 | 8/2006 | Bocking | |
| 2006/0234762 A1 | 10/2006 | Ozluturk | |
| 2007/0042777 A1 | 2/2007 | Govindarajan et al. | |
| 2007/0067734 A1 | 3/2007 | Cunningham | |
| 2007/0255797 A1 | 11/2007 | Dunn et al. | |
| 2008/0009324 A1* | 1/2008 | Patel | H04W 48/18 455/566 |
| 2008/0113692 A1 | 5/2008 | Zhao | |

\* cited by examiner

SERVICE MODE DISPLAY ON A HANDHELD COMMUNICATION DEVICE

FIELD OF THE INVENTION

The invention described herein relates to a handheld communication device that is capable of communicating over different communication modes.

BACKGROUND OF THE INVENTION

Modern handheld communication devices are configured with multiple wireless transceivers which provide the device with multiple wireless communication modes. For instance, a handheld communication device could be configured for voice communication over a Global System for Mobile Communications (GSM) network, and data communication with Bluetooth peripheral devices. A handheld computing device could be configured for data communication over both a General Packet Radio Service/Enhanced Data rates for GSM Evolution (GPRS/EDGE) network and a local WiFi (IEEE 802.11x) network.

Configuring a single communication device to communicate over different communication modes obviously enhances the versatility of the device. However, this enhanced versatility can be problematic since the user often has limited control over the communication modes that are available at any given time. As a result, the user might expect the device to be communicating over a free WiFi network, when, in fact, the device is actually communicating over a billable GSM network. Similarly, the user might expect the device to be communicating over a high-speed short-range WiFi network, when, in fact, the device has moved out of range of the WiFi network and is actually communicating over a low-speed long-range GPRS/EDGE network.

Awan (U.S. Pat. No. 6,438,390) describes a cellular telephone that has a LED controller, and a multi-coloured status LED. The LED controller controls the sequence of flashes and the flash colour of the LED to indicate the status of the device. Possible status indicators include no service, in-service, roaming and message waiting.

Murray (U.S. Pat. No. 7,072,468) describes a portable cellular telephone that is configured for both cellular and dispatch communication modes. The telephone includes a pair of light sources, each located within the telephone housing, for visually indicating the active communication mode to the user.

BRIEF DESCRIPTION OF THE DRAWINGS

The invention will now be described, by way of example only, with reference to the accompanying drawings, in which.

DETAILED DESCRIPTION OF THE PREFERRED EMBODIMENT

Figure 1:
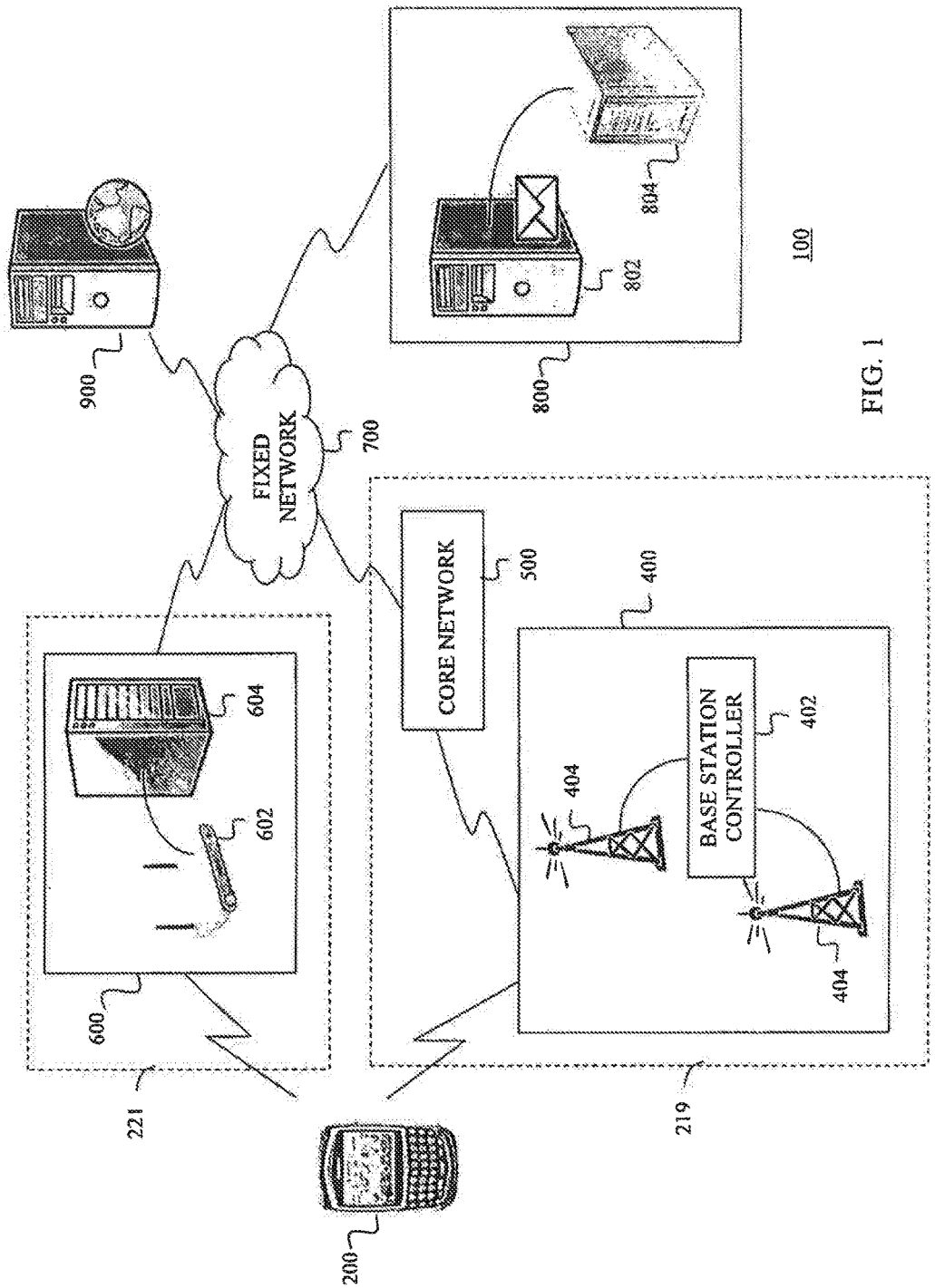
FIG. 1 is a schematic diagram depicting a communications network, including the handheld communications device according to the invention.

By way of overview, the invention described herein relates to a handheld communication device which is capable of multiple communication modes and provides a user-indication of the active communication mode in a data communication window of the communication device.

As will be described in further detail below, in accordance with a first aspect of the invention, there is provided a method of communication in a handheld communication device that is capable of a plurality of wireless communication modes. The method, according to this first aspect of the invention, begins by receiving, at the handheld communication device, a notification of the wireless communication mode(s) that is/are available to the handheld communications device.

Then, in a data communication window of the communication device, a user-indication of an active one of the available wireless communication modes is provided in accordance with the received communication mode indication. The data communication window is configured to facilitate data communication via the plurality of wireless communication modes. The data communication window facilitates the data communication via the active wireless communication mode.

In accordance with a second aspect of the invention, there is provided a wireless communications device that comprises communication mode authorization means, communication means, and communication mode indicating means in communication the with the communication mode authorization means and the communication means.

The communication mode authorization means is configured to receive a notification of the wireless communication mode(s) that is/are available to the handheld communications device. The communication means is configured to render a data communication window for data communication via the plurality of wireless communication modes. The communication mode indicating means is configured to provide, in the data communication window, a user-indication of the active one of the available wireless communication modes in accordance with the received communication mode indication.

In accordance with a third aspect of the invention, there is provided a computer readable medium that carries processing instructions for an electronic communications device that is capable of a plurality of wireless communication modes. The processing instructions, when executed by a computer processor of the communications device, enables the device to implement data communication in the communication device.

The method, according to this third aspect of the invention, begins by receiving, at the handheld communication device, a notification of the wireless communication mode(s) that is/are available to the handheld communications device.

Then, in a data communication window of the communication device, a user-indication of the active one of the available wireless communication modes is provided in accordance with the received communication mode indication. The data communication window is configured to facilitate data communication via the plurality of wireless communication modes. The data communication window facilitates the data communication via the active wireless communication mode.

As will be described below, in a preferred implementation the communication mode authorization means is configured to determine the active wireless communication mode based on a predetermined preference for one of the available wireless communication modes. Further, the data communication window is associated with a data communication service, and the communication mode authorization means is also configured to determine the active wireless communication mode based on an availability of the data communication service via the preferred wireless communication mode.

Each of the wireless communication modes is available over a wireless carrier frequency, and the communication mode authorization means is also configured to transmit over at least one of the wireless carrier frequencies registration information to a provider of the associated wireless communication mode, and to receive from the communication mode provider (as the available mode notification) an authorization for use of the respective communication mode.

Further, the wireless communications device is configured to receive at least one communication service. The communication mode indicating means is configured to provide a user-indication of the active communication mode for the communication service. Preferably, the communication mode indicating means is configured to render an icon in the data communication window indicative of the active communication mode for the communication service.

In the preferred implementation, the data communication service comprises a cellular communication mode or a WiFi communication mode, and the rendered icon comprises either a cellular icon indicating the cellular communication mode, or a WiFi icon indicating the WiFi communication mode. Where the active communication mode comprises the cellular communication mode, preferably the cellular icon comprises either a GPRS icon indicating a GPRS data communication mode, or an EDGE icon indicating an EDGE data communication mode.

Turning now to FIG. 1, a communications network, denoted generally as 100, is shown comprising at least one wireless communications device 200, and a wireless communications network and a wired communications network both in communication with the wireless communications devices 200. The wireless communications network comprises a primary wireless network 219 and a secondary wireless network 221. In the embodiment shown, the primary wireless network comprises a long-range cellular network, and the secondary wireless network comprises a short range local area wireless network. However, the wireless communications network is not limited to any particular number or configuration of wireless networks. For instance, the primary and secondary wireless networks 219, 221 may both comprise long-range cellular networks, or short range wireless networks. Further, the wireless communications network may comprises a plurality of long-range cellular networks and/or a plurality of short range wireless networks.

As shown, the long-range wireless cellular network 219 comprises a plurality of remote base station subsystems (BSSs) 400, and a core network 500 in communication with the BSSs 400. The short-range local area network 221 comprises at least one local wireless node 600. The wired communications network comprises at least one e-mail service 800, at least one web server 900, and a fixed network 700 in communication with the long-range wireless cellular network 219, the short-range local area network 221, the e-mail services 800 and the web servers 900.

The BSSs 400 of the long-range wireless cellular network 219 communicate with the core network 500 via a wired or optical link, and provide a bridge between the wireless communications devices 200 and the core network 500.

As shown, each BSS 400 includes a Base Station Controller (BSC) 402 and a plurality of Base Transceiver Stations (BTSs) 404. Each BTS 404 includes one or more radio transceivers, the coverage area of each defining a long-range radio system cell. Preferably, the BTSs 404 are configured to communicate with the wireless communications devices 200 over the radio system cells via a long-range wireless communications protocol, such as GSM and/or Code Division Multiple Access (CDMA). However, the BSSs 404 may implement other long-range communication protocols.

Each BTS 404 is connected to the BSC 402 via a wired or optical link. The BSC 402 acts as a physical connection between the handheld communications device 200 and the core network 500.

Preferably, the core network 500 facilitates digital communication between the handheld communications devices 200 and the fixed network 700. Preferably, the core network 500 implements data (e.g. GPRS/EDGE) and/or telephony communications protocols. The core network 500 communicates with the fixed network 700 via a wired or optical link, and acts as switching node to the fixed network 700. Typically, the fixed network 700 comprises a Public Switched Telephone Network (PSTN) or an Integrated Services Digital Network (ISDN).

The local wireless node 600 of the short-range wireless local area network 221 communicates with the fixed network 700 via a wired or optical link, and provides a bridge between the local wireless communications devices 200 and the fixed network 700. As shown, the local wireless node 600 includes a wireless base station 602, and a local base station controller 604 coupled to the wireless base station 602.

The base station 602 includes one or more radio transceivers, the coverage area of each defining a local area cell. Preferably, the base station 602 communicates with the local wireless communications devices 200 over the local area cell via a short-range wireless communications protocol, such as IEEE 802.11x and/or Bluetooth. However, the wireless base station 602 may implement other short-range wireless communications protocols.

The base station 602 is connected to the local base station controller 604 via a wired or optical link. The local base station controller 604 acts as a physical connection between the handheld communications device 200 and the fixed network 700, and facilitates digital communication between the handheld communications devices 200 and the fixed network 700. The local base station controller 604 communicates with the fixed network 700 via a wired or optical link.

The local wireless node 600 may be implemented within a private institution, in which case the local base station controller 604 provides restricted access to the fixed network 700 to only wireless communications devices 200 that are registered users of the local wireless node 600. Alternately, the local wireless node 600 may be implemented at public site, in which case the local base station controller 604 provides unrestricted access to the fixed network 700.

Each e-mail service 800 comprises an e-mail server 802 and an authorization database 804 in communication with the e-mail server 802, and provides e-mail services for the handheld communications devices 200. The e-mail server 802 maintains an e-mail account for each registered user of the e-mail service 800, including the e-mail messages that are sent from and received in each e-mail account. Typically, the e-mail server 802 comprises a Microsoft Outlook Exchange Server, Novell Groupwise Server or other e-mail server solution, configured with a Blackberry Enterprise Server option.

The authorization database 804 includes authorization records for each e-mail account. Typically, the authorization records comprise unique Personal Identification Number (PIN) entries which identify the handheld communications device 200 associated with each e-mail account, and encryption keys which the e-mail server 802 uses for the encrypted delivery of e-mail messages between the e-mail server 802 and the handheld communications devices 200.

Each web server 900 implements a web site having content for rendering on the handheld communications devices 200. Preferably, the web server 900 provides the handheld communications devices 200 with web pages that have limited content. Alternately, or additionally, the web server may serve web pages that are written in WML (Wireless Markup Language). The web server 900 may be publicly available, or may be deployed behind a firewall.

Figure 2:
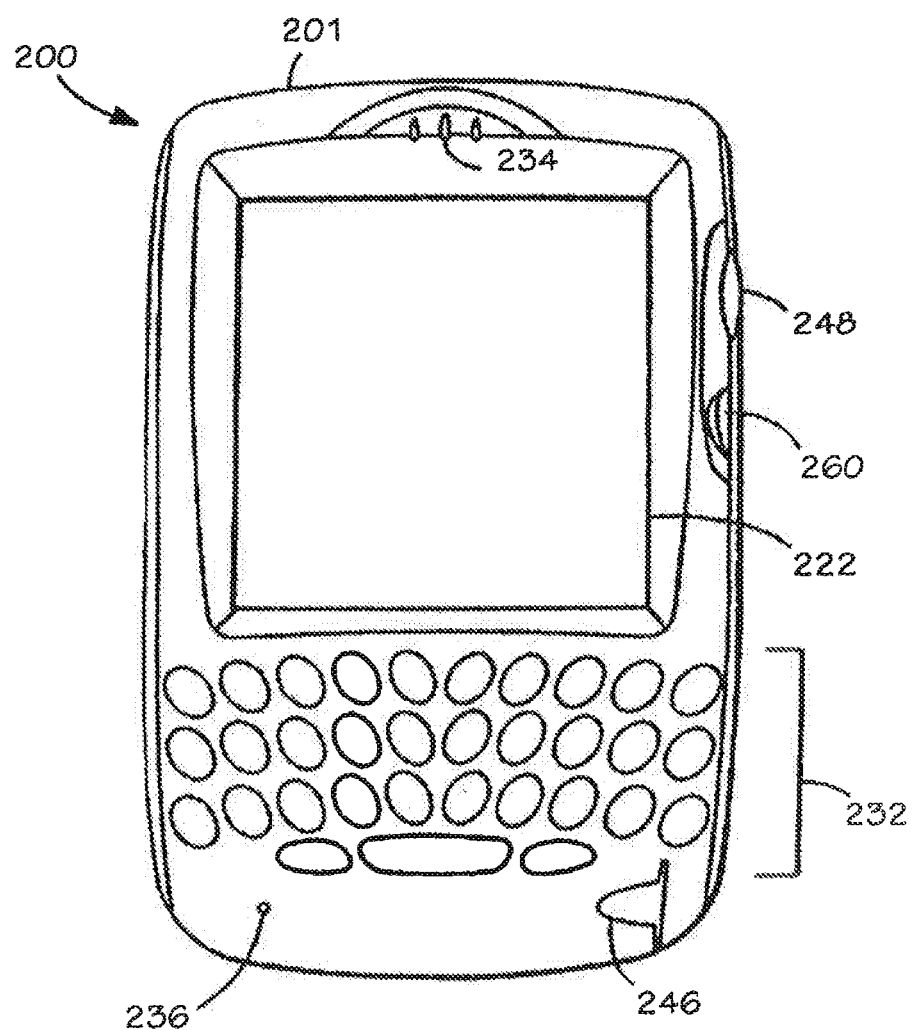
FIG. 2 is a front plan view of the handheld communications device depicted in FIG. 1.

Referring now to FIG. 2, there is shown a sample handheld communications device 200 in accordance with the invention. Preferably, the handheld communications device 200 is a two-way wireless communications device having at least voice and data communication capabilities, and is configured to operate within the wireless cellular network 219 and/or the local area wireless network 221. Further, preferably the handheld communications device 200 has the capability to communicate with other computer services that are available via the Internet, such as the e-mail service 800 and the web server 900. Depending on the exact functionality provided, the wireless handheld communications device 200 may be referred to as a data messaging device, a two-way pager, a wireless e-mail device, a cellular telephone with data messaging capabilities, a wireless Internet appliance, or a data communication device, as examples.

As shown, the handheld communications device 200 includes a display 222, a function key 246, and data processing means 202 (not shown) disposed within a common housing 201. The display 222 comprises a backlit LCD display. The data processing means 202 is in communication with the display 222 and the function key 246. In one implementation, the backlit display 222 comprises a transmissive LCD display, and the function key 246 operates as a power on/off switch. Alternately, in another implementation, the backlit display 222 comprises a reflective or transreflective LCD display, and the function key 246 operates as a backlight switch.

In addition to the display 222 and the function key 246, the handheld communications device 200 includes user data input means for inputting data to the data processing means 202. As shown, preferably the user data input means includes a keyboard 232, a thumbwheel 248 and an escape key 260. The keyboard 232 includes alphabetic and numerical keys, and preferably also includes a "Send" key and an "End" key to respectively initiate and terminate voice communication. However, the data input means is not limited to these forms of data input. For instance, the data input means may include a trackball or other pointing device instead of (or in addition to) the thumbwheel 248.

Figure 3:
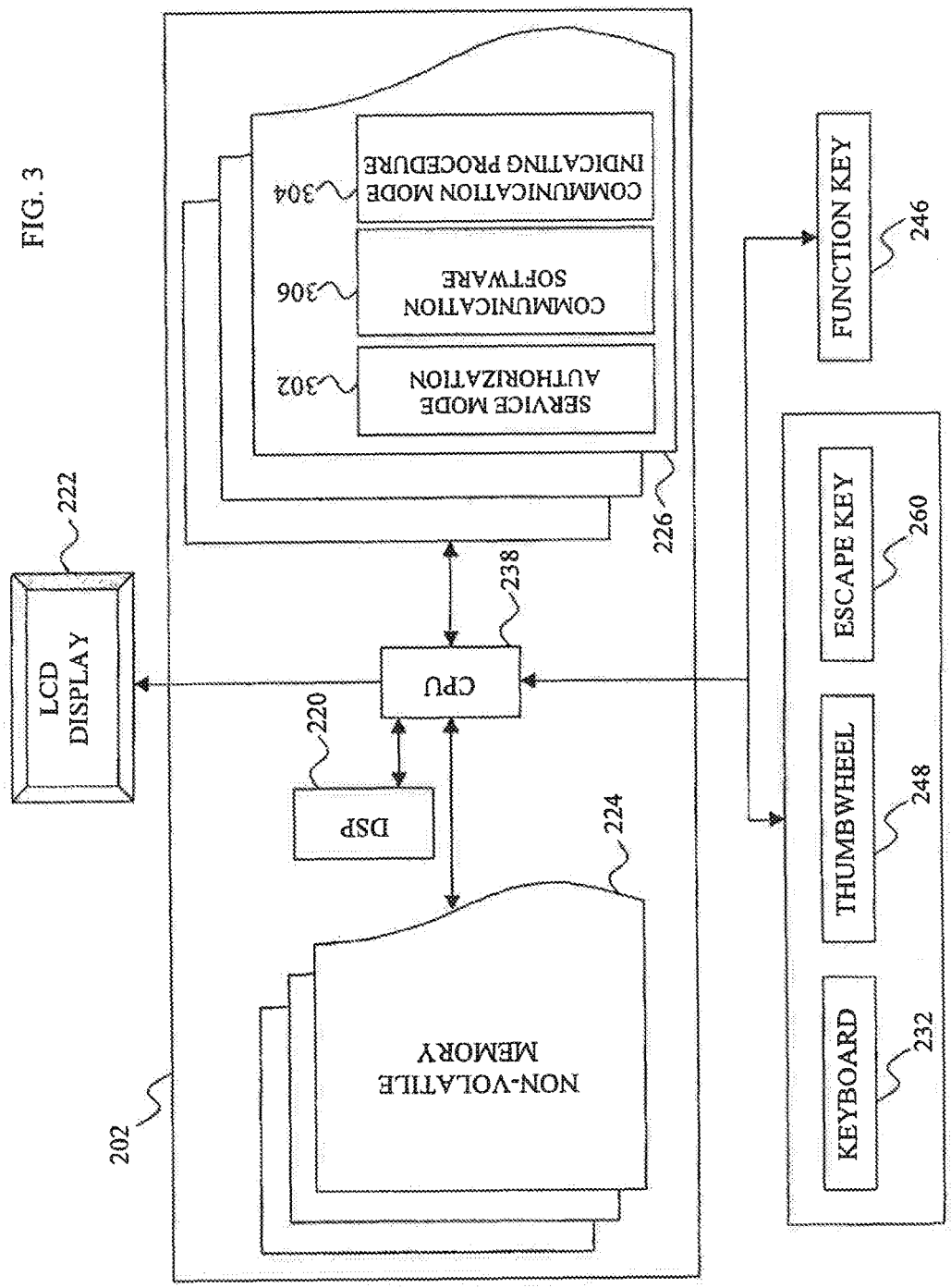
FIG. 3 is a schematic diagram depicting certain functional details of the data processing means of the handheld communications device, including the communication mode authorization procedure, a communication procedure, and a communication mode indicating procedure.

As shown in FIG. 3, the data processing means 202 comprises a microprocessor 238 in communication with flash memory 224 and volatile memory (RAM) 226. The flash memory 224 includes computer processing instructions which, when executed by the microprocessor 238, implement an operating system, computer programs, and operating system specific applications. The operating system comprises an Open Systems Interconnection (OSI) communication protocol stack that allows the handheld communications device 200 to send and receive communication signals over the wireless cellular network 219 and the local area wireless network 221. Alternately, the computer processing instructions may be copied from the flash memory 224 into the RAM 226 upon system reset or power-up, and executed by the microprocessor 238 out of the RAM 226.

The operating system also includes a communication mode authorization procedure 302, and a communication mode indicating procedure 304. The functions of the communication mode authorization procedure 302 and the communication mode indicating procedure 304 will be discussed in greater detail below. However, it is sufficient at this point to note that the communication mode indicating procedure 304 is in communication with the communication mode authorization procedure 302 and communication software 306 (e.g. internet browser, e-mail software and/or telephone software) on the handheld communications device 200, and that the communication mode authorization procedure 302 and the communication mode indicating procedure 304 together comprise a method that provides a user-indication of the active communication mode(s) in a data communication window of the handheld communications device 200.

It should also be understood that although the communication mode authorization procedure 302 and communication mode indicating procedure 304 are preferably implemented as a set of computer processing instructions, these procedures may be implemented in electronics hardware instead.

Figure 4:
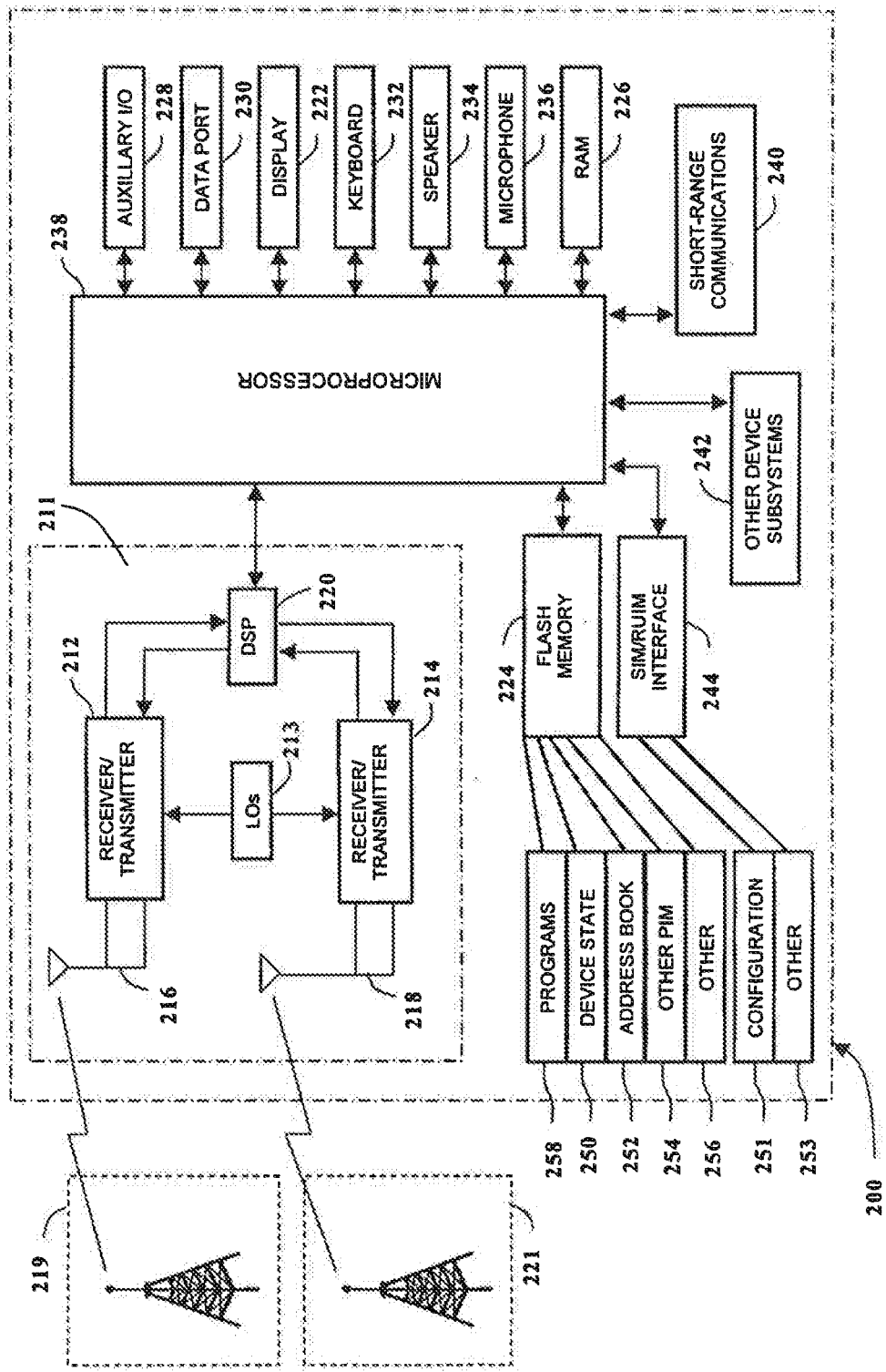
FIG. 4 is a schematic diagram depicting certain additional functional details of the handheld communications device.

FIG. 4 depicts functional details of the handheld communications device 200. As shown, the handheld communications device 200 incorporates a motherboard that includes a communication subsystem 211, and the microprocessor 238. Further, the communications device 200 also includes a SIM interface 244 if the handheld communications device 200 is intended for use within a GSM network, and/or a RUIM interface 244 if the handheld communications device 200 is intended for use within a CDMA network. The communication subsystem 211 performs communication functions, such as data and voice communications, and includes a primary transmitter/receiver 212, a secondary transmitter/receiver 214, a primary internal antenna 216 for the primary transmitter/receiver 212, a secondary internal antenna 218 for the secondary transmitter/receiver 214, and local oscillators (LOs) 213 and one or more digital signal processors (DSP) 220 coupled to the transmitter/receivers 212, 214.

The communication subsystem 211 sends and receives wireless communication signals over the wireless cellular network 219 via the primary transmitter/receiver 212 and the primary internal antenna 216. The communication subsystem 211 also sends and receives wireless communication signals over the local area wireless network 221 via the secondary transmitter/receiver 214 and the secondary internal antenna 218.

Signals received by the primary internal antenna 216 from the wireless cellular network 219 are input to the receiver section of the primary transmitter/receiver 212, which performs common receiver functions such as frequency down conversion, and analog to digital (A/D) conversion, in preparation for more complex communication functions performed by the DSP 220. Signals to be transmitted over the wireless cellular network 219 are processed by the DSP 220 and input to transmitter section of the primary transmitter/receiver 212 for digital to analog conversion, frequency up conversion, and transmission over the wireless cellular network 219 via the primary internal antenna 216.

Similarly, signals received by the secondary internal antenna 218 from the local area wireless network 221 are input to the receiver section of the secondary transmitter/receiver 214, which performs common receiver functions such as frequency down conversion, and analog to digital (A/D) conversion, in preparation for more complex communication functions performed by the DSP 220. Signals to be transmitted over the local area wireless network 221 are processed by the DSP 220 and input to transmitter section of the secondary transmitter/receiver 214 for digital to analog conversion, frequency up conversion, and transmission over the local area wireless network 221 via the secondary internal antenna 218. As discussed above, the communication subsystem 211 may include more than one DSP 220, in which case the signals transmitted and received by the secondary transmitter/receiver 214 would preferably be processed by a different DSP than the primary transmitter/receiver 212.

The SIM/RUIM interface 244 is similar to a card-slot into which a SIM/RUIM card can be inserted and ejected like a diskette or PCMCIA card. The SIM/RUIM card holds many key configurations 251, and other information 253 including subscriber identification information, such as the International Mobile Subscriber Identity (IMSI) that is associated with the handheld communications device 200, and subscriber-related information, such as the unique PIN that is assigned to the handheld communications device 200.

The microprocessor 238 controls the overall operation of the device, interacting with device subsystems such as the display 222, flash memory 224, RAM 226, auxiliary input/output (I/O) subsystems 228, data port 230, keyboard 232, speaker 234, microphone 236, short-range communications subsystem 240, and device subsystems 242. The data port 230 may comprise a RS-232 port, a Universal Serial Bus (USB) port or other wired data communication port.

As shown, the flash memory 224 includes both computer program storage 258 and program data storage 250, 252, 254 and 256. Computer processing instructions are preferably also stored in the flash memory 224 or other similar non-volatile storage. Other computer processing instructions may also be loaded into a volatile memory such as RAM 226. The computer processing instructions, when accessed from the memory 224, 226 and executed by the microprocessor 238 define the operating system, computer programs, operating system specific applications. The computer processing instructions may be installed onto the handheld communications device 200 upon manufacture, or may be loaded through the wireless network 219, the auxiliary I/O subsystem 228, the data port 230, the short-range communications subsystem 240, or the device subsystem 242.

The operating system allows the handheld communications device 200 to operate the display 222, the auxiliary input/output (I/O) subsystems 228, data port 230, keyboard 232, speaker 234, microphone 236, short-range communications subsystem 240, and device subsystems 242. Typically, the computer programs include communication software 306 (FIG. 3) that configures the handheld communications device 200 to receive one or more communication services. For instance, preferably the communication software 306 includes internet browser software, e-mail software, telephone software and GPS-mapping software that respectively allow the handheld communications device 200 to communicate with various computer servers over the internet, send and receive e-mail, initiate and receive telephone calls, and view electronic maps. Further, preferably the communication mode authorization procedure 302 is configured with information identifying the communication mode(s) that support each communication service, and the communication service associated with each communication program.

Preferably, the internet browser software is configured to implement the Blackberry Mobile Data Service (MDS) transport protocol, since web servers 900 configured with MDS transport protocol optimize HTML content prior to transmission to the handheld communication device 100. MDS transport protocol also allows the handheld communications device 100 to access web servers 900 that are located behind a firewall, and is supported over both GSM and WiFi networks. However, the invention is so not limited, and can be implemented with a non-MDS internet browser, including a browser that is configured to only recognize WML content.

In data communication mode, a received text message or web page download will be processed by the communication subsystem 211 and output to the display 222, or alternatively to an auxiliary I/O device 228. A user of the handheld communications device 200 may compose data items such as email messages for example, using the keyboard 232. Such composed items may then be transmitted over the wireless cellular network 219 or the local area wireless network 221 through the communication subsystem 211.

For voice communications, overall operation of the handheld communications device 200 is similar, except that received signals would preferably be output to the speaker 234 and signals for transmission would be generated by a microphone 236. Further, the display 222 may provide an indication of the identity of a calling party, the duration of a voice call, or other voice call related information for example.

Figure 5:
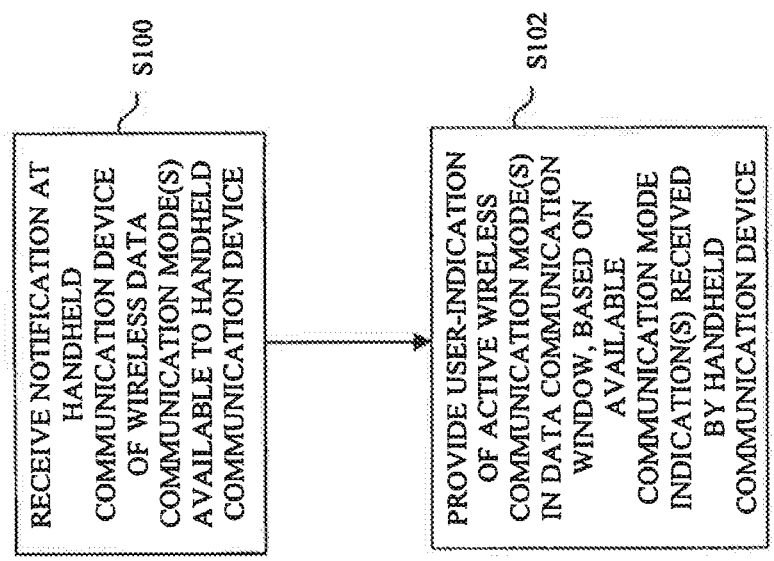
FIG. 5 is a flow chart depicting, by way of overview, the method performed by the handheld communications device when providing a user-indication of the active communication mode in a data communication window of the communication device.

FIG. 5 is a flow chart that depicts, by way of overview, the method implemented in the handheld communications device 200 for providing a user-indication of the active communication mode(s). The communication device 200 is configured to implement a plurality of wireless modes of communication.

At step S100, the handheld communications device 200 receives notification of the wireless communication mode(s) that are available to the handheld communication device 200. In the example shown in FIG. 1, the wireless cellular network 219 comprises one mode of wireless communication, and the local area wireless network 221 comprises another mode of wireless communication. However, the invention is not so limited. For instance, in one variation, the communications network 100 includes a plurality of non-overlapping local area wireless networks 221, in which case each local area wireless network 221 comprises a distinct mode of wireless communication.

Based on the available communication mode indication(s) received by the communication device 200, at step S102 the communication device 200 provides a user-indication of the active wireless communication mode(s). Preferably, the communication device 200 provides a visual indication of the active communication services via a data communication window that is rendered on the display 222.

Specifically, preferably the communication device 200 is configured to receive one or more wireless communication services via one or more of the modes of wireless communication. In the example shown in FIG. 1, the communication services comprise the e-mail service 800 and the web server 900. However, the invention is not limited to any particular services. For instance, in one variation, the communications network services include a telephony service, a text messaging service, a virtual private network (VPN) service, and a global positioning system (GPS)-mapping service. Other forms of communication services are contemplated by the invention.

The communication device 200 renders the data communication window on the display 222. The data communication window facilitates data communication with a provider of one of the wireless communication services via the available wireless communication mode(s). Preferably, communication device 200 also renders the user-indication of the active wireless communication mode(s) in the data communication window. However, other user-indications are contemplated by the invention, such as audio indications via the speaker 234. Further, the user indications may comprise combinations of a combination of these notification mechanisms.

Figure 6A:
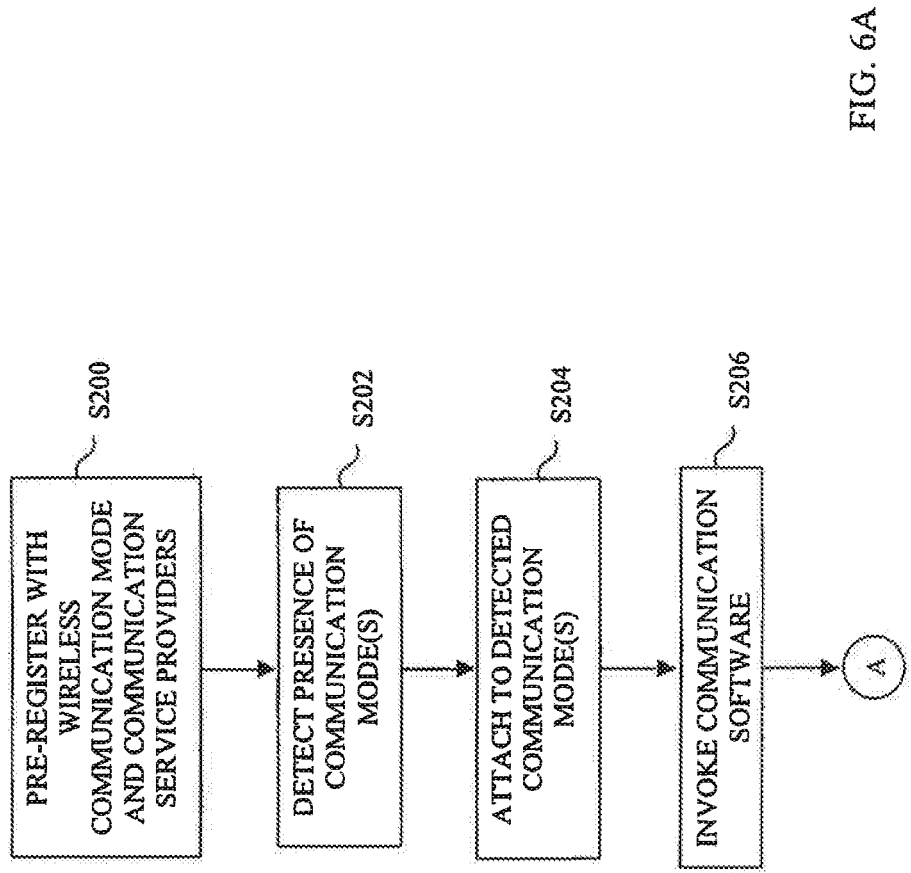
FIG. 6 (comprising FIGS. 6a to 6b) is a flow chart depicting, in detail, the method performed by the handheld communications device when providing the user-indication of the active communication mode.
Figure 6B:
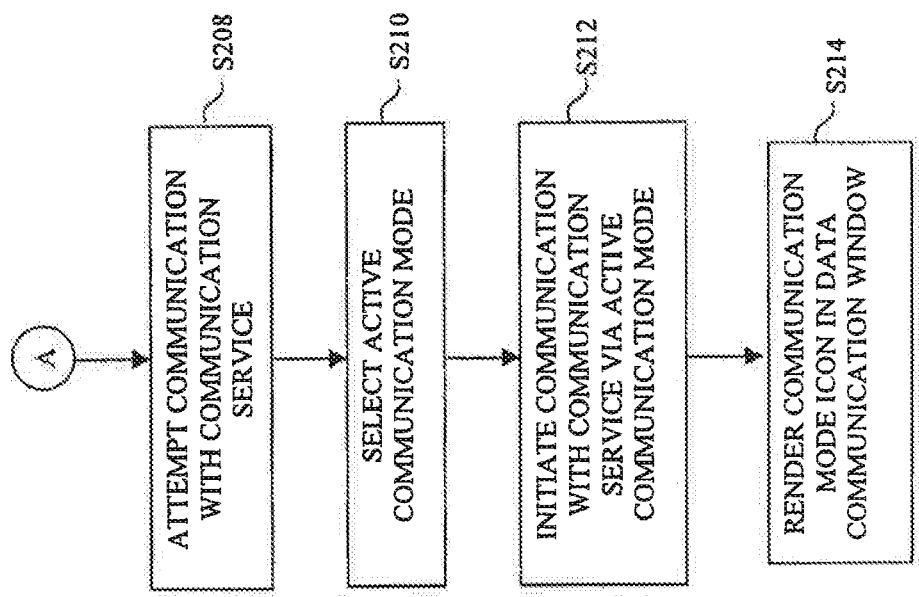

FIG. 6 depicts, in detail, the sequence of steps performed by the handheld communications device 200 when providing the user-indication of the active communication mode(s) at the communication device 200. For ease of understanding, the following example will assume that the user-indication is provided in association with the internet browser software that is installed on the communications device 200. It should be understood, however, that the invention is not limited for use with internet browser software, but may be implemented with other communication software 306, such as the e-mail and telephone software.

At step S200, the user of the handheld communications device 200 pre-registers to have access to one or more wireless communications modes, if required. For instance, typically a user must pre-register (i.e. subscribe to a wireless coverage plan) to have access to the wireless cellular network 219. Alternately, however, typically a user need not pre-register to have access to the local area wireless network 221. However, the local wireless node 600 might be implemented at a café, in which case access to the local area wireless network 221 might be restricted to customers of the café.

At step S200, the user of the handheld communications device 200 also pre-registers to have access to one or more services on the handheld communications device 200. In the example shown in FIG. 1, the communication services comprise the e-mail service 800 and the web server 900. However, as discussed above, the communication services may also include other services, such as a telephony service, a text messaging service, a virtual private network (VPN) service, and/or a global positioning system (GPS)-mapping service.

One or more of these communication services may be pay-for-use services. For instance, the e-mail service 800, the telephony service, and the text messaging service may be available only by subscription. Accordingly, at step S200, the user of the handheld communications device 200 pre-registers with the provider of the pay-for-use service(s) prior to gaining access to the service. The service provider of the pay-for-use service maintain records for each registered user of the pay-for-use communication service.

Other communication services may be restricted, for security reasons, to certain pre-authorized users. For instance, the web server 900 may comprise a business intranet, which is available only to authorized employees. A business VPN service would also typically be available only to authorized employees. Accordingly, at step S200, the user of the handheld communications device 200 also pre-registers with the provider of the restricted service(s) prior to gaining access to the service. As above, the service provider maintain records for each registered user of the restricted communication service.

Conversely, other communication services may be unrestricted. For instance, the web service 900 and the GPS-mapping service may be publicly available. The user of the handheld communications device 200 would not have to register with the provider of the unrestricted services, at step S200, to gain access to the service.

After the user of the handheld communications device 200 pre-registers with the wireless communication modes and communication service providers (as may be required), at step S202 the communications device 200 detects the communication modes that are available to the communications device 200 in the geographical region in which the communications device 200 is currently located. To do so, the communication mode authorization procedure 302 determines the signal strength of the RF carrier signals that are received at the primary internal antenna 216 and the secondary internal antenna 218.

At step S204, the communication mode authorization procedure 302 attempts to attach to the detected communication mode(s). If the communication mode authorization procedure 302 detects only the presence of a single communication mode, and the signal strength of the detected communication mode is greater than a minimum threshold level, the communication mode selection procedure 302 attempts to attach to that detected communication mode. However, more than one communication mode may be available to the handheld communications device 200, with the signal strength of each communication mode being greater than the respective minimum threshold level. Therefore, preferably the communication mode selection procedure 302 is configured to attempt to attach to each detected communication mode whose signal strength is greater than a minimum threshold level.

To attach to a detected communication mode, typically the communication mode authorization procedure 302 transmits subscriber information to the communication mode provider, if required by the detected communication mode. If the user of the handheld communications device 200 is authorized to use the detected communication mode, the communication mode provider responds to the communication mode authorization procedure 302 with a confirmatory notice.

For instance, if the detected communication mode is a GSM network 219, and the handheld communications device 200 has recently powered up and is configured with communication protocol software for GSM communication, the communication mode selection procedure 302 attempts to register with the GSM network by transmitting the IMSI of the handheld communications device 200 to the GSM network provider. If the user of the handheld communications device 200 is authorized to use the detected communication mode, the network provider responds to the IMSI with a Temporary Mobile Subscriber Identity (TMSI).

Similarly, if the handheld communications device 200 is configured with communication protocol software for data (e.g. GPRS/EDGE) communication, the communication mode selection procedure 302 attempts to register for GPRS/EDGE data communication with the core network 500 by issuing an attach request to the core network 500. If the core network 500 previously assigned a Packet-TMSI (P-TMSI) to the handheld communications device 200, the attach request includes the P-TMSI, the routing area identity (RAI) of the routing area where the P-TMSI was assigned, and information concerning the data communication capabilities of the handheld communications device 200 (e.g. supported frequency bands, ciphering capabilities). If the user of the handheld communications device 200 is authorized to use the detected communication mode, the core network 500 responds to the handheld communications device 200 with an attach accept message, which includes a new P-TMSI.

If the detected communication mode is a WiFi (IEEE 802.11x) network 221, and the handheld communications device 200 is configured with communication protocol software for WiFi communication, the communication mode selection procedure 302 listens for the Service Set Identifier (SSID) that is broadcast (if any) by the base station 602 of the local wireless node 600, and then connects to the local wireless node 600 having the specified SSID. Further, if access to the WiFi network 221 is restricted to pre-registered users of the WiFi network 221, the handheld communication device 100 transmits to the base station 602 the user's assigned username/password to thereby gain access to the WiFi network 221.

Step S204 may involve multiple attach attempts, particularly where more than one communication mode is detected, but the communication mode selection procedure 302 determines that it is not authorized to use one of the detected communication modes. Therefore, in the event that the communication mode selection procedure 302 attempts to attach to one of the detected communication modes, and determines that it is not authorized to use that communication mode, the communication mode selection procedure 302 still attempts to attach to the other detected communication mode(s) (if available).

After the handheld communications device 200 has successfully attached to one or more of the detected communication modes, at step S206 the user of the handheld communications device 200 invokes the communication software 306 on the handheld communications device 200 for data communication with a provider of a desired communication service. In response, the invoked communication software 306 renders a data communication window on the LCD display 222 of the handheld communications device 200. The data communication window facilitates data communication with the communication service provider, and displays information that is received from and/or transmitted to the communication service provider.

Preferably, the invoked communication software 306 is configured to facilitate data communication with the communication service provider via more than one data communication mode. Further, preferably the desired communication service is an internet browser service, such as the internet service provided by the web servers 900. However, as discussed above, the user may invoke other communication software 306, such as the e-mail software, the telephone software or the GPS-mapping software.

The invoked communication software 306 attempts to communicate with one of the communication service providers. To do so, at step S208, the communication software 306 requests that the communication mode authorization procedure 302 open a communication channel with the data communication service provider that is associated with the invoked communication software.

For instance, if the user of the handheld communications device 200 invokes the internet browser software, the communication software 306 will request the communication mode authorization procedure 302 initiate data communication with one or more of the web servers 900. If the user invokes the e-mail software, the communication software 306 will request the communication mode authorization procedure 302 initiate data communication with the e-mail service 800. If the user invokes the telephone software, the communication software 306 will request the communication mode authorization procedure 302 initiate data communication with a voice over IP (VoIP) service provider (not shown).

In response, at step S210 the communication transport mode authorization procedure 302 selects one of the communication transport modes as the active communication transport mode. The communication transport mode selected by the communication mode authorization procedure 302, at step S210, depends, in part, upon the communication mode(s) to which the communication mode selection procedure 302 successfully attached.

For instance, if the communication mode authorization procedure 302 only successfully attached to the wireless cellular network 219, and the requested data communication service is available via the communication mode that is supported on that network (e.g. GPRS or EDGE), the communication mode authorization procedure 302 will select "cellular" as the active communication mode. Conversely, if the communication mode authorization procedure 302 only successfully attached to the local area wireless network 221, and the requested data communication service is available via the communication mode that is supported on that network, the communication mode authorization procedure 302 will select "WiFi" as the active communication mode.

The communication mode selected by the communication transport mode determining procedure 302, at step S210, also depends on the availability of the data communication service via the respective communication mode(s). Accordingly, as discussed above, preferably the communication mode determining procedure 302 is configured with information identifying the communication mode(s) that support each communication service, and the communication service associated with each communication program. Therefore, if the communication mode selection procedure 302 successfully attached to more than one communication mode, preferably the communication mode selection procedure 302 is configured to select a preferred communication mode as the active communication mode if the requested data communication service is available to the handheld communications device 200 via more than one of these communication modes. Conversely, if the requested data communication service is only available via one of these communication modes, the communication transport mode authorization procedure 302 selects the communication mode that can provide the requested communication service.

For instance, if the handheld communications device 200 is authorized to use both the wireless cellular network 219 and the local area wireless network 221, and the requested data communication service is available via GPRS/EDGE and WiFi communication transport modes, to reduce communication costs preferably the communication mode selection procedure 302 initially selects "WiFi" as the active communication mode. However, if the requested data communication service is only available via GPRS/EDGE, the communication mode authorization procedure 302 selects "cellular" as the active communication mode, notwithstanding that the local area wireless network 221 is otherwise available to the handheld communications device 200.

If none of the foregoing conditions are met (e.g. the handheld communications device 200 does not detect the presence of any communication mode, or none of the detected communication modes are available to the handheld communications device 200, or the service associated with the invoked communications software 306 is not available via any of the authorized detected communication modes), the communication mode selection procedure 302 does not select an active communication mode.

At step S212, the communication transport mode authorization procedure 302 opens a communication channel with the communication service via the active communication transport mode. The invoked communication software then commences communication with the associated service provider via the active communication transport mode.

At step S214, the communication mode indicating procedure 304 determines the active communication mode from the communication mode selection procedure 302, and renders a communication mode icon on the data communication window that is indicative of the active communication mode. The communication software 306 continues data communication with the associated service provider via the active communication mode.

The communication mode selection procedure 302 continuously determines the communication modes that are available to the handheld communications device 200, and notifies the communication mode indicating procedure 304 of any changes in the active communication mode. Therefore, if the handheld communications device 200 moves from a region that serviced by one communication mode to a region that is serviced by another communication mode, the communication mode indication procedure 304 will dynamically update the user-indication of the new active communication mode. The communication software 306 continues communication with the communication service provider via the new active communication mode, to the extent that the communication service is available over the new active communication mode.

Preferably, the communication mode icons comprise graphical text-like labels. For instance, if the active communication mode is "WiFi", preferably the communication mode icon comprises a graphical "WiFi" label. If the active communication mode is "cellular", and the handheld communications device 200 is configured for EDGE data communication, preferably the communication mode icon comprises a graphical "EDGE" label. If the active communication mode is "cellular", and the handheld communications device 200 is only configured for GPRS data communication, preferably the communication mode icon comprises a graphical "GPRS" label.

Alternately, if the communication mode selection procedure 302 did not select an active communication mode, preferably the communication mode icon comprises a graphical "edge" or "gprs" label, depending upon the configuration of the handheld communications device 200, to indicate that the handheld communications device 200 is configured for GPRS or EDGE data communication, as the case may be, but that such data communication service is not available to the handheld communications device 200.

It should be understood, however, that the invention is not limited to the foregoing communication mode icons. Rather, other communication mode icons, such as graphical symbols, that are capable of indicating the active communication mode are contemplated by the invention.

Preferably, the communication mode indicating procedure 304 renders the communication mode as graphical text-like labels in a status bar of the data communication window. Sample data communication windows, depicting preferred text-like labels, are shown in FIGS. 7 to 9.

Figure 7:
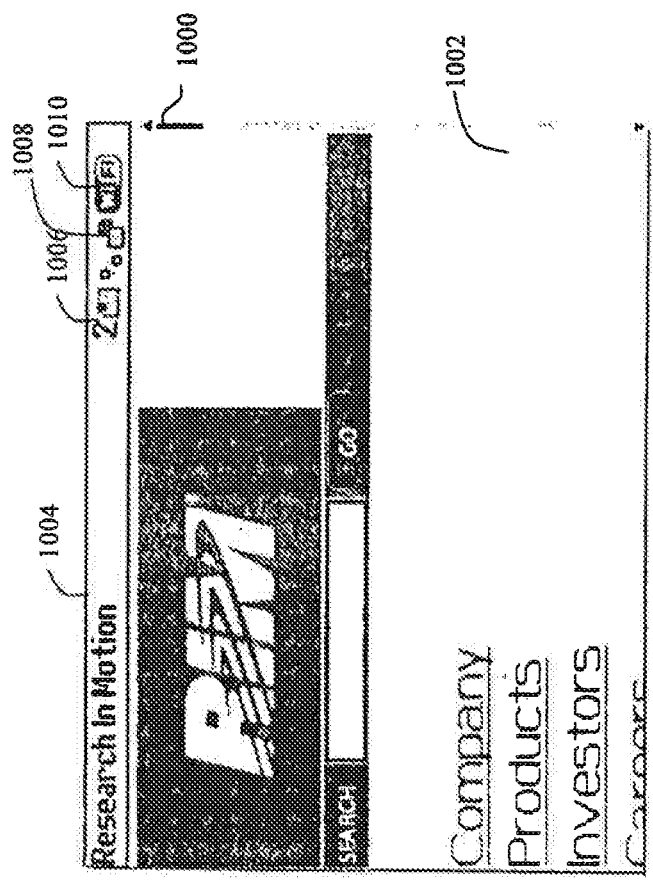
FIGS. 7 to 9 are screenshots that depict sample user-indications of the active communication modes.

FIG. 7 depicts a data communication window 1000 which includes an information window 1002, and a status bar 1004 above the information window 1002. The information window 1002 is used to render information on the display 222 based on the HTML and/or WML web pages that are received from the web servers 900. The status bar 1004 includes an e-mail read status icon 1006, and a encryption status icon 1008.

The e-mail read status icon 1006 indicates whether the e-mail communication software has any unread e-mail messages. The encryption status icon 1008 indicates whether the communication channel between the handheld communications device 100 and the web server 900 is encrypted. The status bar 1004 also includes a graphical "WiFi" label 1010 which indicates that WiFi is the active communication mode.

Figure 8:
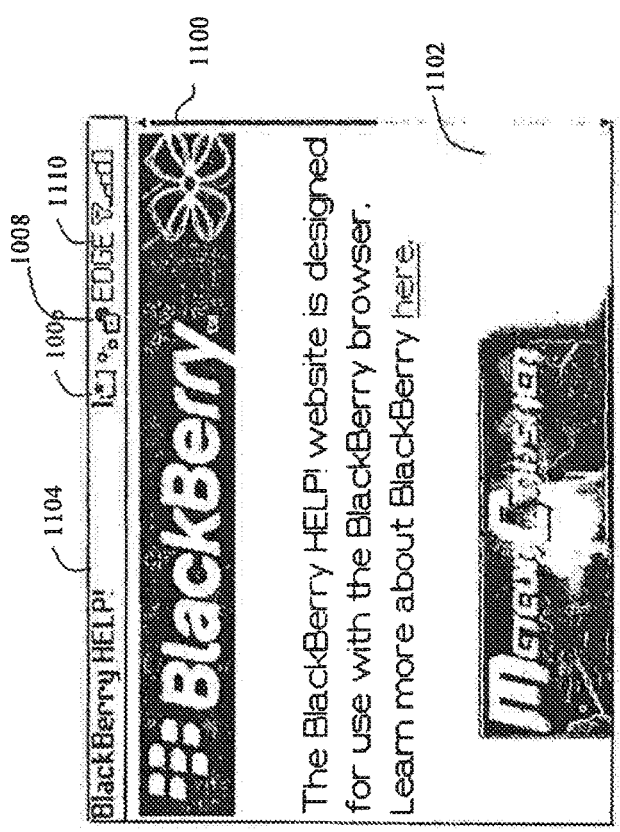
Figure 9:
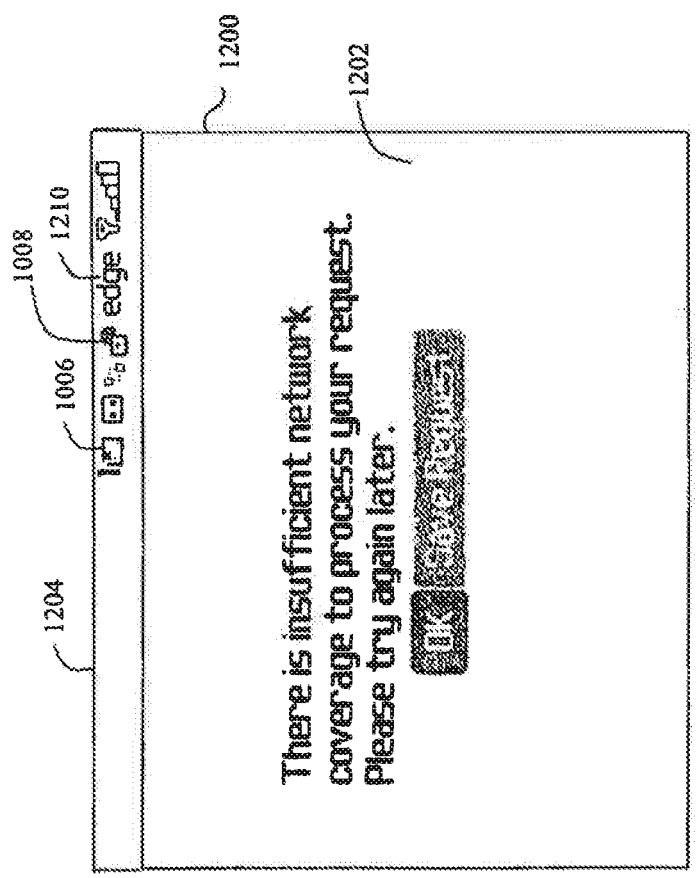

FIG. 8 depicts a data communication window 1100, which is a variant of the data communication window of FIG. 7. The data communication window 1100 includes a an information window 1102, and a status bar 1104 which are respectively substantially identical to the information window 1002 and the status bar 1004. However, the status bar 1104 includes a graphical "EDGE" label 1110 instead of the graphical "WiFi" label 1010. The "EDGE" label 1110 indicates that EDGE is the active data communication mode.

FIG. 9 depicts a data communication window 1200, which is a variant of the data communication window of FIG. 7. The data communication window 1200 includes an information window 1202, and a status bar 1204 which are respectively substantially identical to the information window 1002 and the status bar 1004. However, the status bar 1204 includes a graphical "edge" label 1210 instead of the graphical "WiFi" label 1010. The lower-case "edge" label 1210 indicates that GSM is the active communication mode. This lower-case label is preferred over a "GSM" label since it is rendered when either of the following conditions exist:

(1) the handheld communications device 100 is configured for EDGE/GPRS data communication, but the core network 500 does not support EDGE/GPRS; or
(2) that the handheld communications device 100 is not authorized for EDGE/GPRS data communication.

The scope of the monopoly desired for the invention is defined by the claims appended hereto, with the foregoing description being merely illustrative of the preferred embodiment of the invention. Persons of ordinary skill may envisage modifications to the described embodiment which, although not explicitly suggested herein, do not depart from the scope of the invention, as defined by the appended claims.

The invention claimed is:

1. A method of communication with a user equipment, the method comprising:
    maintaining, in a storage of the user equipment, communication mode information for each communication software of a plurality of available communication software, wherein the selected communication software comprises at least one of an e-mail software, a web software, a text messaging software, a virtual private network software, a data communication software, and a global positioning system mapping software;
launching a selected communication software on the user equipment;
receiving a request from the selected communication software to open a communication channel for use with the selected communication software;
determining an active communication mode that supports the selected communication software, the determining being based on the communication mode information;
selecting the active communication mode as a communication mode based on the communication mode information;
opening the communication channel for the selected communication software on the active communication mode;
displaying a visual indication of the active communication mode.

2. The method of claim 1, wherein the active communication mode is selected from a plurality of communication modes.

3. The method of claim 2, wherein the active communication mode is a preferred communication mode for the selected communication software.

4. The method of claim 2, wherein each of the plurality of communication modes is available over a wireless carrier frequency, and further comprises the steps of transmitting over at least one of the wireless carrier frequencies registration information to a provider of the associated communication mode, and receiving from the communication mode provider an authorization for use of the respective communication mode.

5. The method of claim 1, wherein the active communication mode comprises a cellular communication mode or a WiFi communication mode.

6. The method of claim 5 wherein the visual indication is a cellular icon or a WiFi icon.

7. The method of claim 6, wherein the selected communication software comprises the data communication software, the active communication mode comprises the cellular communication mode, and the cellular icon comprises a General Packet Radio Service 'GPRS' icon indicating a GPRS data communication mode or an Enhanced Data rates for GSM Evolution 'EDGE' icon indicating an EDGE data communication mode.

8. A wireless communications device comprising:
a processor;
a display; and
a communication subsystem,
wherein wireless communications device is configured to:
maintain, in a storage of the wireless communications device, communication mode information for each communication software of a plurality of available communication software, wherein the selected communication software comprises at least one of an e-mail software, a web software, a text messaging software, a virtual private network software, a data communication software, and a global positioning system mapping software;
launch a selected communication software on the wireless communication device;
receive a request from the selected communication software to open a communication channel for use with the selected communication software;
determine an active communication mode that supports the selected communication software, the determining being based on the communication mode information;
select the active communication mode as a communication mode based on the communication mode information;
open the communication channel for the selected communication software on the active communication mode;
display a visual indication of the active communication mode.

9. The wireless communications device of claim 8, wherein the active communication mode is selected from a plurality of communication modes.

10. The wireless communications device of claim 8, wherein the active communication mode is a preferred communication mode for the selected communication software.

11. The wireless communications device of claim 8, wherein the active communication mode comprises a cellular communication mode or a WiFi communication mode.

12. The wireless communications device of claim 11, wherein the visual indication is a cellular icon or a WiFi icon.

13. The wireless communications device of claim 12, wherein the selected communication software comprises the data communication software, the active communication mode comprises the cellular communication mode, and the cellular icon comprises a General Packet Radio Service 'GPRS' icon indicating a GPRS data communication mode or an Enhanced Data rates for GSM Evolution 'EDGE' icon indicating an EDGE data communication mode.

14. The wireless communications device of claim 9, wherein each of the plurality of communication modes is available over a wireless carrier frequency, and further comprises the steps of transmitting over at least one of the wireless carrier frequencies registration information to a provider of the associated communication mode, and receiving from the communication mode provider an authorization for use of the respective communication mode.

15. A non-transitory computer readable medium having instructions stored thereon for execution by a processor of a wireless communications device, the instructions comprising code for:
maintaining, in a storage of the wireless communications device, communication mode information for each communication software of a plurality of available communication software, wherein the selected communication software comprises at least one of an e-mail software, a web software, a text messaging software, a virtual private network software, a data communication software, and a global positioning system mapping software;
launching a selected communication software on the wireless communication device;
receiving a request from the selected communication software to open a communication channel for use with the selected communication software;
determining an active communication mode that supports the selected communication software, the determining being based on the communication mode information;
selecting the active communication mode as a communication mode based on the communication mode information;
opening the communication channel for the selected communication software on the active communication mode;

displaying a visual indication of the active communication mode.

\* \* \* \* \*